J. BRENNAN.
BANANA UNLOADER.
APPLICATION FILED AUG. 5, 1921.
1,422,656.
Patented July 11, 1922.
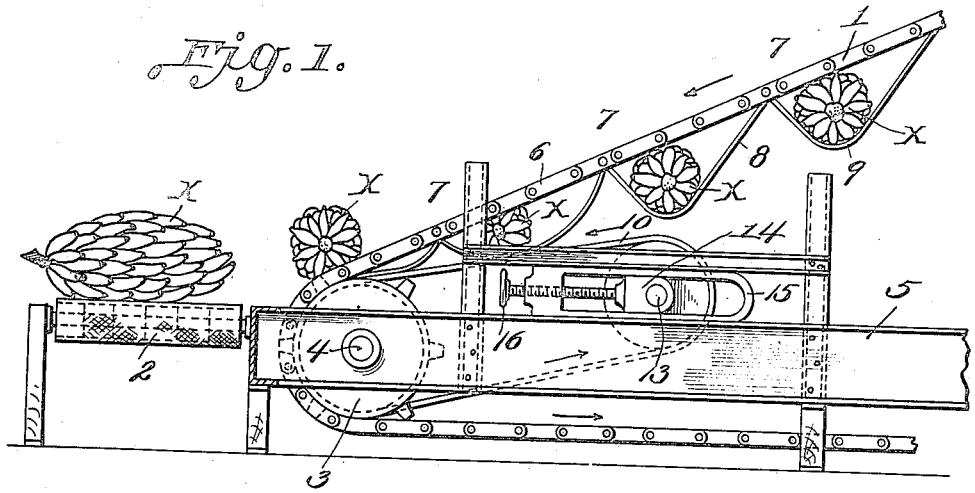
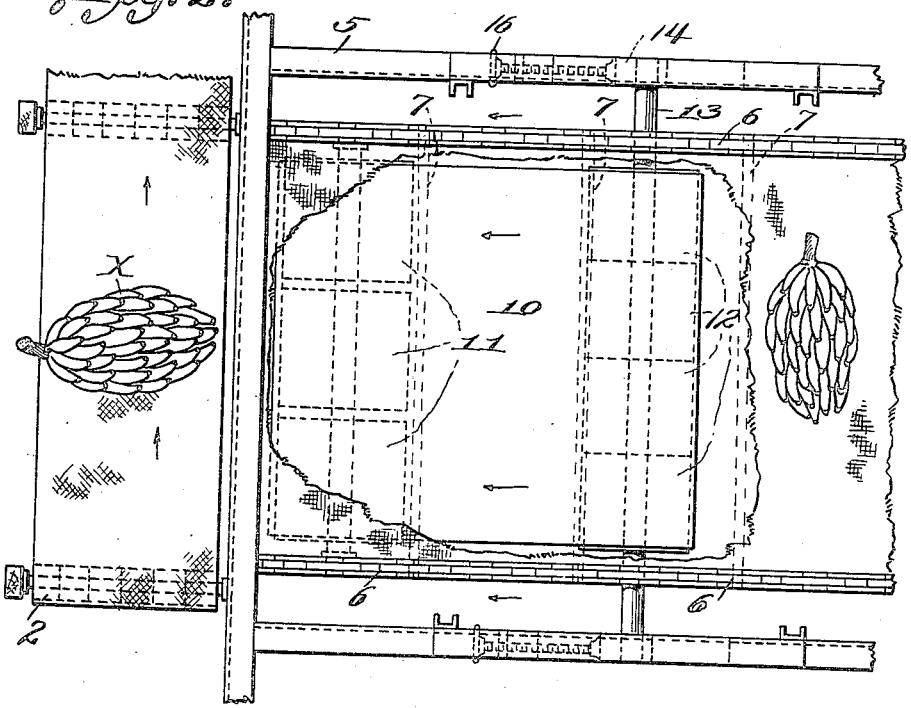
Inventor:
James Brennan,
by James L. Norris,
Attorney.

UNITED STATES PATENT OFFICE.

JAMES BRENNAN, OF NEW ORLEANS, LOUISIANA.

BANANA UNLOADER.

1,422,656.    Specification of Letters Patent.    Patented July 11, 1922.

Application filed August 5, 1921. Serial No. 490,030.

*To all whom it may concern:*

Be it known that I, JAMES BRENNAN, a citizen of the United States, residing at New Orleans, in the parish of Orleans and State of Louisiana, have invented new and useful Improvements in Banana Unloaders, of which the following is a specification.

My present invention relates to improvements in apparatus for unloading or otherwise transporting or handling articles of different kinds and particularly fruits or vegetables which require care in handling, in order to avoid damage or injury thereto, the invention being especially applicable to the unloading or handling of bunches of bananas.

The primary object of the invention is to provide novel and improved apparatus, whereby bunches of bananas or other fruits or vegetables or the like can be unloaded expeditiously and with minimum damage or injury thereto, and at relatively small cost, and the manual labor heretofore required for this purpose is rendered unnecessary.

To these and other ends, the invention consists in certain improvements and combinations and arrangements of parts, all as will be hereinafter more fully described, the features of novelty being pointed out particularly in the claims at the end of the specification.

In the accompanying drawing:—

Figure 1 is a side elevation of an apparatus constructed in accordance with the preferred embodiment of the invention and adapted for the unloading or dumping of bunches of bananas, and Figure 2 is a top plan view of the apparaus shown in Figure 1.

Similar parts are designated by the same reference characters in both figures of the drawing.

The present invention is applicable generally to the unloading, handling or dumping of articles of various kinds, although it is particularly applicable to the dumping, unloading or handling of bunches of bananas or bananas on the stalk, and other fruits, vegetables and the like which require great care in handling, to avoid injury which would result in spoiling. The preferred embodiment of the invention is shown in the accompanying drawing and will be hereinafter described in detail. It is to be understood, however, that the invention is not restricted to the precise construction shown, as equivalent constructions are contemplated and these will be included within the scope of the claims.

In the present instance, part of a banana unloading apparatus is shown which is of the type employed, for example, in the unloading of bananas on the stalk from ships, 1 designating the traveling conveyer which moves in the direction of the arrow and serves to carry the bunches of bananas from the hold on the ship to the unloading point on the dock, 2 designating a suitable conveyer which receives the bunches of bananas from the conveyer 1 and conduct them to appropriate points where they may be stored or removed. The conveyer 1 which brings the bunches of bananas from the hold of the ship may be driven and supported by mechanism similar to that now generally used in banana unloaders, its unloading end passing around a pair of sprocket wheels 3 which are fixed on a shaft 4, the latter being journaled in a suitable supporting frame 5, and the conveyer 1, as shown, consists of a pair of chains 6 which pass over the sprocket wheels 3 and the other supporting sprocket wheels of the apparatus, these chains having cross bars 7 extending between them and supporting at regular intervals a slack canvas belt 8, this canvas belt 8 thus forming pockets 9 in which the bunches of bananas designated X may rest. The conveyer 1 conducts the bunches of bananas from the ship or other loading point to the unloading point of the conveyer 2, while the bunches of bananas X rest in the pockets 9 of the canvas belt, as is shown clearly in Figure 1.

The present invention provides novel and improved means for unloading the bunches of bananas mechanically from the conveyer 1 so that manual lifting or handling of the bunches of bananas, as heretofore required, is rendered unnecessary, and moreover, the bunches of bananas are so handled as to minimize damage or injury thereto. Preferably and as shown, the unloading means comprises an endless belt 10 which may be composed of rubber or other flexible relatively soft material which passes around belt pulleys 11 which are preferably fixed on the shaft 4 which carries the conveyer sprocket wheels 3, and the other end of the belt 10 passes around suitable pulleys 12 which are mounted on a shaft 13, the ends of the latter being fitted preferably in bearings 14 which are slidable or adjustable in suitable guides 15 supported on the frame 5, and are adjusted to maintain the proper tension on the belt 10 by the screws 16 which act against the bearings 14. The pulleys 11 for the belt 10 are preferably of a diameter slightly less than the diameter of the sprocket wheels 3 for the conveyer 1 and the axis of the pulleys 12 is so located that the upper stretch of the belt 10 will extend at an acute angle to the upper stretch of the conveyer 1, the upper stretch of the belt 10 being preferably tangent to its pulleys 11 at approximately the point where the upper stretch of the conveyer 1 is tangent to its sprocket wheels 3. The belt 10 by this arrangement will be driven in unison with the conveyer 1 at substantially the same speed as the conveyer 1, the upper stretch of the belt 10 traveling in the same direction in which the upper stretch of the conveyer 1 travels, as will be understood from the arrows in Figure 1.

The mode of operation of the invention is briefly as follows: The bunches of bananas rest by gravity in the pockets 9 of the canvas belt 8 forming part of the conveyer 1 and the bananas are transported or conveyed in this way until the bottoms of the pockets 9 come into contact with the upper stretch of the belt 10. From this point on, as the conveyer 1 continues to advance, the convergent relation between the conveyer 1 and the upper stretch of the belt 10 will produce a progressive lifting action upon the bunches of bananas in the pockets, this action continuing until each bunch of bananas reaches a point substantially above the shaft 4, at which time the bunch of bananas will be completely lifted until the pocket no longer sustains the bunch from rolling forward relatively to the conveyer 1. In consequence, the bunch of bananas will roll forward from the conveyer 1 and will be thus transferred to the receiving conveyer 2 which may be of any suitable construction and may serve to convey the bunches of bananas to any desired delivery point. The unloading or dumping action produced by the belt 10 occurs each time one of the pockets 9 containing a bunch of bananas comes into contact with the upper stretch of the belt 10, the bunches of bananas being thus unloaded or dumped without requiring manual assistance or handling.

Unloading apparatus constructed in accordance with the present invention enables fruits, vegetables and like articles, and especially bananas on the stalk, to be unloaded or dumped mechanically, thus avoiding the expense and other objections incident to manual unloading or handling, and, moreover, it enables this result to be accomplished expeditiously and with minimum damage or injury, this being particularly important the unloading or handling of bunches of bananas which are heavy and easily injured and hence require delicate handling to minimize spoilage. This object is attained by gradually or progressively lifting the bunches contained in the pockets of the conveyer, and moreover, by so lifting the bunches, minimum load is imposed on the driving motor for the apparatus. By driving the lifting belt from the conveyer which carries the bunches, a simplified and improved construction is provided which minimizes the cost of construction, operation and maintenance.

I claim as my invention:—

1. In an unloading apparatus of the class having a travelling conveyer provided with depending pockets to contain articles, a travelling member operating adjacent to the conveyer and gradually engaging the pockets thereof while the conveyer advances to thus lift articles contained in the pockets.

2. In an unloading apparatus of the class having a travelling conveyer provided with flexible pockets in which articles are adapted to rest, a travelling belt movable in the same direction with the conveyer and converging toward the conveyer whereby the pockets of the latter are brought gradually into engagement with the belt and the articles in such pockets are gradually removed therefrom.

3. In a banana unloader having a travelling conveyer with depending flexible pockets to contain bunches of bananas, a travelling belt located beneath the conveyer and at a convergent angle thereto and operative to progressively receive the pockets of the conveyer and to relatively lift the bunches therein.

4. In a banana unloader, the combination with a travelling conveyer with depending flexible pockets to contain bunches of bananas, and a shaft over which the conveyer travels, of a pulley on said shaft, and a belt travelling over said pulley and having a stretch thereof arranged opposite to and converging toward the under side of the conveyer.

5. In a banana unloader, the combination with a conveyer having depending pockets to contain bunches of bananas, a stretch of said conveyer being inclined, and a shaft over which the lower end of said stretch of the conveyer passes, of a travelling belt arranged beneath and in converging relation with said inclined stretch of the conveyer, and a pulley on said shaft and over which said belt passes, said pulley driving the belt in unison with and in the same direction in which the conveyer travels.

In testimony whereof I have hereunto set my hand in presence of two subscribing witnesses.

JAMES BRENNAN.

Witnesses:
 LIONEL R. EVANS,
 O. C. ERNST.